US009866161B1

(12) United States Patent  (10) Patent No.: US 9,866,161 B1
Johnson et al.  (45) Date of Patent: Jan. 9, 2018

(54) UNIVERSAL MONITOR AND FAULT DETECTOR IN FIELDED GENERATORS AND METHOD

(71) Applicants: Warren B Johnson, Fort Worth, TX (US); Christopher M Stimek, Fort Worth, TX (US); Peter C Gardner, Fort Woth, TX (US)

(72) Inventors: Warren B Johnson, Fort Worth, TX (US); Christopher M Stimek, Fort Worth, TX (US); Peter C Gardner, Fort Woth, TX (US)

(73) Assignee: Williams RDM, Inc., Fort Worth, TX (US)

( * ) Notice: Subject to any disclaimer, the term of this patent is extended or adjusted under 35 U.S.C. 154(b) by 284 days.

(21) Appl. No.: 14/573,196

(22) Filed: Dec. 17, 2014

Related U.S. Application Data

(60) Provisional application No. 62/001,620, filed on May 21, 2014.

(51) Int. Cl.
  *G08B 21/00* (2006.01)
  *H02P 9/14* (2006.01)
  *G05B 13/02* (2006.01)
  *H02P 9/04* (2006.01)

(52) U.S. Cl.
  CPC ............ *H02P 9/14* (2013.01); *G05B 13/0265* (2013.01); *H02P 9/04* (2013.01)

(58) Field of Classification Search
  CPC .... H01L 22/20; G06Q 10/0637; G06Q 10/20; G01M 15/05; G05B 19/418; G05B 19/4187
  USPC .... 340/425.5, 438, 648, 506, 646, 679, 514, 340/515; 702/185, 82, 34, 65, 104, 3, 35, 702/50; 707/755; 705/7.36, 14.41; 701/109, 107, 31.4
  See application file for complete search history.

(56) References Cited

U.S. PATENT DOCUMENTS

| | | | | |
|---|---|---|---|---|
| 4,937,561 A * | 6/1990 | Sasaki | ...................... | H02H 7/06 318/434 |
| 5,210,704 A * | 5/1993 | Husseiny | ............... | G01H 1/003 702/34 |
| 6,029,512 A * | 2/2000 | Suganuma | .......... | G01M 13/023 322/29 |
| 6,127,964 A * | 10/2000 | Kageyama | ............ | G01S 7/4004 340/903 |
| 7,403,850 B1 * | 7/2008 | Boutin | .................. | G01M 15/05 701/107 |

(Continued)

*Primary Examiner* — Hoi Lau
(74) *Attorney, Agent, or Firm* — Morani Patent Law PC

(57) ABSTRACT

A method and system for monitoring an engine driven generator system (GMS) is provided herein. The system self-configures across generator types and manufacturers via a learning algorithm. Additional sensors are included in the system to provide a robust set of sensor data. Data analysis employed includes comparison to threshold levels, trending of historical data, and Wavelet analysis. A graphical touch screen is provided to users for both controlling the GMS and for viewing results. Monitoring results include operating conditions, existing faults, and warnings of undesirable conditions. Ethernet connections afford review of real time data, diagnostic feedback, and prognostic information at a central location. A sleep state of the GMS conserves generator battery life.

12 Claims, 15 Drawing Sheets

(56) References Cited

U.S. PATENT DOCUMENTS

| | | | |
|---|---|---|---|
| 2005/0159911 A1* | 7/2005 | Funk | G05B 19/418 702/104 |
| 2005/0177269 A1* | 8/2005 | Funk | G05B 19/4187 700/121 |
| 2005/0216175 A1* | 9/2005 | Takahashi | F02D 41/1454 701/109 |
| 2007/0299575 A1* | 12/2007 | Yamada | G06Q 10/20 701/31.4 |
| 2010/0256514 A1* | 10/2010 | Chazan | G01N 21/783 600/532 |
| 2011/0068913 A1* | 3/2011 | Bechtler | B60T 8/885 340/506 |
| 2011/0288799 A1* | 11/2011 | Cortes | G01R 15/207 702/65 |
| 2012/0318011 A1* | 12/2012 | Ochiai | F25B 49/005 62/127 |
| 2013/0041748 A1* | 2/2013 | Hsiao | G06Q 30/02 705/14.41 |
| 2013/0085901 A1* | 4/2013 | Henderson | G06Q 10/04 705/28 |
| 2013/0238261 A1* | 9/2013 | Denis | G06F 19/3468 702/50 |
| 2013/0304385 A1* | 11/2013 | Gillette, II | G01N 33/0009 702/6 |
| 2014/0222521 A1* | 8/2014 | Chait | G06Q 10/0637 705/7.36 |
| 2014/0222522 A1* | 8/2014 | Chait | G06Q 10/0637 705/7.36 |
| 2014/0358465 A1* | 12/2014 | Shin | H01L 22/20 702/82 |
| 2015/0192697 A1* | 7/2015 | Hosking | G01W 1/10 702/3 |

\* cited by examiner

Table-1 ─ 180

| Sensors | |
|---|---|
| Oil Pressure | 185-1 |
| Engine Coolant Temperature | 185-2 |
| Manifold Absolute Pressure | 185-3 |
| Battery Voltage | 185-4 |
| Alternator Output Current | 185-5 |
| Engine Vibration | 185-6 |
| Output Voltage | 185-7 |
| Output Current | 185-8 |

Table-2 ─ 190

| Parameters Measured | |
|---|---|
| Oil Pressure | 195-1 |
| Coolant Temperature | 195-2 |
| AC Output Voltage, Current and Frequency | 195-3 |
| Air Intake Pressure (Intake Vacuum) | 195-4 |
| Starter Current | 195-5 |
| Engine Speed (RPM) | 195-6 |
| Fuel Level | 195-7 |
| Vibration | 195-8 |
| Power Quality | 195-9 |
| Battery Voltage and Current | 195-10 |
| Alternator Charging Current | 195-11 |
| Ambient Temperature | 195-12 |

Table-3 — 300

Overview of System Performance — 301

- System Overview — 310
  - Oil Pressure — 311
  - Engine Coolant — 312
  - Battery Voltage — 313
  - Total System Power — 314
  - System Status — 315
- Power Measurements — 320
  - Voltage & Amps for Each Phase — 321
  - Power Factor — 322
  - Frequency — 323
  - Phase Imbalance — 324
  - Faults — 325
    - Ground Fault — 325-1
    - Phase Imbalance Fault — 325-2
    - Voltage Fault — 325-3
    - Frequency Fault — 325-4
    - Wet Stacking Fault — 325-5
- Battery / Alternator Measurements — 330
  - Battery Voltage — 331
  - Alternator Current — 332
  - Faults — 333
    - Alternator Under Current Fault — 333-1
    - Alternator Over Current Fault — 333-2
    - Alternator Diode Fault — 333-3
    - Low Battery Fault — 333-4
    - Cranking Low Battery Fault — 333-5
- Engine Mechanical — 340
  - Oil Pressure — 341
  - Coolant Temperature — 342
  - Manifold Absolute Pressure — 343
  - Vibration — 344
  - Faults — 345
    - Low Oil Pressure Fault — 345-1
    - High Oil Pressure Fault — 345-2
    - Low Coolant Temperature Fault — 345-3
    - High Coolant Temperature Fault — 345-4
    - High Intake Vacuum Fault — 345-5

FIG. 3

Table 5 — 500

"Fault Summary Table" — 501

| Fault | Fault Condition |
|---|---|
| Ground Fault | If the Expected Neutral Current and Actual Neutral Current Differ by More than 1.5A |
| Phase Imbalance Fault | If Total Power > 2000W and Phase Imbalance > 20% |
| Voltage Fault | If Any Phase is Outside of the Range 120V RMS +/- 10% |
| Frequency Fault | If Phase A Frequency is Outside of the Range 60Hz +/- 5% |
| Wet Stacking Warning | If Generator Output Power < 55.5% of Rated Load (18kW) (Based on Generator Panel) |
| Alternator Under Current Fault | If Battery Voltage < 28V and Battery Charging Current < 1A |
| Alternator Over Current Fault | If Battery Voltage > 28.3V and Battery Charging Current > 3A |
| Alternator Diode Fault | If the Percent of Time Battery is Discharging is > 20% When the Average Battery Charging Current is > 2A |
| Low Battery Fault (1) | If Battery Voltage Falls Below 23.4V While Supplying < 10A of Current |
| Low Battery Fault (2) | If the Rate of Change of Battery Charging Current is Less than 15mA/s (Basically the Charge Current is Close to a Steady State Value), the Engine is Running and the Charge Current is > 8A |
| Degraded Battery Fault | If the Engine has been Running for 2 Hours or More and the Battery Charging Current is Greater than 6A |
| Low Cranking Amps Fault | If Battery Voltage Falls Below 14V While Supplying > 10A of Current |
| High Oil Pressure | If the Oil Pressure Rises Above 85 PSI |
| Low Oil Pressure | If the Oil Pressure Falls Below 20 PSI |
| High Coolant Temperature | If the Coolant Temperature Rises Above 220 Degrees Fahrenheit |
| Low Coolant Temperature | If the Coolant Temperature Falls Below 32 Degrees Fahrenheit |
| High Intake Vacuum | If the Intake Vacuum is Greater than 15 inH$_2$O |

FIG. 5

Table 6 — 901  EXISTING SENSORS — 905

| Sending Unit 910 | Subsystem 920 | Measurement 930 | Additional Information Gained 940 |
|---|---|---|---|
| Engine Coolant 912 | Engine Cooling 922 | Temperature 932 | Thermostat Operation, Cooling System Performance 942 |
| Fuel Level 916 | Fuel Delivery 926 | Gallons or % 936 | Fuel Use Rate 946 |

FIG. 9A

Table 7 — 951  ADDITIONAL SENSORS — 952

| Added Measurement 960 | Subsystem 970 | Measurement 980 | Additional Information Gained 990 |
|---|---|---|---|
| Vibration 961 | Engine And Generator Mechanical 971 | Acceleration 981 | Mechanical Integrity, Accessory Behavior 991 |
| Intake Pressure/Vacuum 962 | Engine Air Induction 972 | Pressure or Vacuum 982 | Air Cleaner Status 992 |
| Oil Pressure 963 | Engine Lubrication 973 | Pressure 983 | Lubrication System Performance 993 |
| Battery Voltage and Current 964 | Engine Electrical 974 | Hall Effect Sensor 984 | Battery Health, State of Charge, Alternator Status, Charging Current 994 |
| AC Voltage and Current 965 | AC Generator 975 | Ph A, B, C & N 985 Voltage and Current | Output Frequency, Load Balance, Power Factor, Wet Stacking, Ground Fault, Output Power 995 |
| Ambient Temperature 966 | Operational Conditions 976 | Temperature 986 | Used to Learn Generator Performance under Ambient Conditions 996 |

FIG. 9B

Table 8 ⟋1001

Wavelet Decomposition Level Bands ⟋1002

| Level 1010 | Upper Frequency (Hz) 1020 | Lower Frequency (Hz) 1030 | Center Frequency 1040 | Relevance 1050 |
|---|---|---|---|---|
| (Approx. 8) a8 1011 | 20 1021 | 0 1031 | 10 1041 | N/A 1051 |
| (Detail 8) d8 1012 | 40 1022 | 20 1032 | 30 1042 | Engine Rotational Vibration (1800 RPM) 1052 |
| d7 1013 | 80 1023 | 40 1033 | 60 1043 | Combustion Event Frequency 1053 |
| d6 1014 | 160 1024 | 80 1034 | 120 1044 | N/A 1054 |
| d5 1015 | 320 1025 | 160 1035 | 240 1045 | N/A 1055 |
| d4 1016 | 640 1026 | 320 1036 | 480 1046 | N/A 1056 |
| d3 1017 | 1280 1027 | 640 1037 | 960 1047 | Combustion Event Detail 1057 |
| d2 1018 | 2560 1028 | 1280 1038 | 1920 1048 | Combustion Event Detail 1058 |
| d1 1019 | 5120 1029 | 2560 1039 | 3840 1049 | Combustion Event Detail 1059 |

FIG. 10

Table 9 — 1201

Peak vs Average Combustion Events — 1202

| | No Load — 1210 | | 10 kW Load — 1220 | |
|---|---|---|---|---|
| | Peak (u) — 1230 / 1252 | RMS (u) — 1235 / 1254 | Peak (u) — 1240 / 1256 | RMS (u) — 1245 / 1258 |
| Cylinder 1 — 1250 | 11.06 | 1.78 | 25.10 | 3.87 |
| Cylinder 2 — 1260 | 8.13 / 1262 | 1.20 / 1264 | 13.55 / 1266 | 2.09 / 1268 |
| Cylinder 3 — 1270 | 4.91 / 1272 | 1.10 / 1274 | 9.98 / 1276 | 1.97 / 1278 |
| Cylinder 4 — 1280 | 3.05 / 1282 | 0.85 / 1284 | 6.19 / 1286 | 1.30 / 1288 |

FIG. 12

UNIVERSAL MONITOR AND FAULT DETECTOR IN FIELDED GENERATORS AND METHOD

CROSS REFERENCE TO RELATED APPLICATIONS

This application claims priority to U.S. Provisional Application No. 62/001,620, filed 21 May 2014, the contents of which are incorporated herein by reference.

STATEMENT REGARDING FEDERALLY SPONSORED RESEARCH OR DEVELOPMENT

This invention was made with government support under Contract Nos. W15P7T-11-C-H212 and W15P7T-12-C-A214, between the Department of Defense and Williams-Pyro, Inc. The government has certain rights in the invention.

BACKGROUND OF THE INVENTION

The present invention relates generally to maintaining engine driven generators and more particularly to diagnostics and prognostics of fielded generators via monitoring of the same.

Conventional monitoring and diagnostic systems for generators may be manufacturer and model specific. Employing model specific generator monitoring systems may be cost prohibitive. A more robust or global application which adapts to a given generator would be desirable for the management, operation, and maintenance of a multitude of diverse generator systems.

In certain applications, to include fielded military applications, the effects of generator down time can have far reaching undesirable consequences. Detecting a fault in an engine driven generator, or in the engine of the same, offers some advantages but forecasting faults from continuous monitoring data could provide further advantages and the opportunity for scheduling downtime and reducing the same.

Unscheduled generator down time can have a multitude of negative consequences. Warnings to avoid system failures are desirable. In order to avoid down time, conventional detection devices have been designed that generate feedback regarding an operating engine driven generator. The feedback is then reviewed by an operator to determine the operating conditions of the generator. However, conventional systems that monitor operating engine driven generators typically provide feedback of faults that have already occurred and may have already damaged the engine-generator. As such, though operational feedback is sent to an operator, it is often too late for preventive action to be taken.

Conventional vibration assessment and identification of vibrational faults pose additional challenges. For example, one conventional system provides prognostics of a rotor cage failure in an induction motor using vibration analysis. More particularly, vibration monitoring has been utilized to provide some early misalignment or unbalance-based faults notice. However, when a mechanical resonance occurs, machine vibrations are amplified. Due to this amplification, false positives indicating severe mechanical asymmetry are possible. Vibration signal analysis is also complicated by its short signal length and non-cyclical nature. Instead of vibrations sensors, U.S. Pat. No. 8,405,339 to Zhang et al. teaches generating a current frequency spectrum of stator current using Fast Fourier Transformation and analysis of resulting harmonics to forecast a rotor fault from current sensor data. However, the Fourier Transform also has limitations with respect to vibration signals, which are discussed below.

Other forms of generator monitoring have been explored at some level, each with its own drawbacks. Such drawbacks include, for example, inaccurate vibration assessment, incomplete diagnosis, technically demanding implementation, customization demands, and a lacking in prognostic capability. It would be desirable to obtain a monitoring system with both diagnostics and prognostics that evaluates a multitude of factors, to include vibration, and that produces an accurate assessment of the generator system condition.

SUMMARY OF THE INVENTION

The present invention addresses some of the issues presented above by providing a universal heuristic system for diagnostic and prognostic feedback of a field generator, a generator monitoring system (hereafter a GMS) and method. The present invention adapts to a generator system to provide operational, diagnostic, and prognostic information on electrical and mechanical systems within the subject engine driven generator. The present invention may be applied to a generator deployed in field. A system and method in accordance with the present invention improves generation reliability and decreases maintenance related expenses. Aspects of the present invention are provided for summary purposes and are not intended to be all inclusive or exclusive. Embodiments of the present invention may have any of the aspects below.

One aspect of the present invention is use of Wavelet analysis on vibration sensor data; another aspect of the present invention is use of Wavelet analysis on additional sensor type data.

Another aspect of the present invention is that it can be adopted for use across manufacturers, models, and working configurations.

Another aspect of the present invention is retrofitting additional sensors into an existing generator system to acquire diagnostic input data.

Further, another aspect of the present invention is the user friendly implementation of the system in the field; the system self-configures and the GMS learns the data required for proper operation of the subject generator.

Another aspect of the present invention is the use of fixed data for some parameters.

Another aspect of the present invention is using a custom software architecture in the GMS to monitor sensors.

Another aspect of the present invention is the use of original equipment manufacturer (OEM) sensors to acquire system input data.

Another aspect of the present invention is the use of a processing module and a display module within a GMS.

Another aspect of the present invention is the achievement of a universal solution by using, in part, additional sensors to include: oil pressure; engine coolant temperature; manifold absolute pressure; battery voltage; alternator output current; engine vibration; generator output voltage; and generator output current.

Another aspect of the present invention is the use of a PC-104 form factor, the PC-104 card stack is made up of several circuit cards in the processing module of the GMS, and this stacking of buses can be more rugged than typical PC bus connections.

Another aspect of the present invention is control capability of external devices, such as an environmental control unit, by the GMS.

Another aspect of the present invention is control capability of the generator by the GMS.

Another aspect of the present invention is low powered sleep state until the generator powers on.

Another aspect of the present invention may be monitoring oil pressure and battery voltage as indicators of a generator in a powering up state.

Another aspect of the present invention is use of a touch screen display unit to provide a local onsite user interface.

Another aspect of the present invention may be to support Ethernet connection to any standard network using an integrated RJ45 bulkhead connector.

Still another aspect of the present invention is the provision of enhanced user interface via a web browser from a network enabled GMS.

And still another aspect of the present invention is the communication by a deployed GMS processing module to a central server and a central operation center to provide real time updates of individual GMS modules across a network of generators.

Yet another aspect of the present invention is the continuous collection of sensor data by software residing on a single board computer.

Another aspect of the present invention is an initial comparison of acquired data comparison to heuristic factors to detect a warning state or a fault condition.

Another aspect of the present invention is the collection of environmental sensor data, such as atmospheric pressure and ambient temperature.

Yet another aspect of the present invention is to provide GPS data associated with the fielded generator.

Yet another aspect of the present invention is trending of data types for assessment of operating conditions and/or fault conditions.

Yet another aspect of the present invention is forecasting of historical data, which may include initial Learning data.

Yet another aspect of the present invention is to provide a universal system, readily implemented to any generator system regardless of manufacturer, configuration, or model.

Those skilled in the art will further appreciate the above-noted features and advantages of the invention together with other important aspects thereof upon reading the detailed description that follows in conjunction with the drawings.

BRIEF DESCRIPTION OF THE FIGURES

For more complete understanding of the features and advantages of the present invention, reference is now made to the detailed description of the invention along with the accompanying figures, wherein:

FIGS. 1A, 1B, and 1C show a block diagram of a GMS processing module with sensor source locations, a list additional of sensors, and a list of parameters measured, in accordance with an exemplary embodiment of the present invention;

FIG. 3 shows exemplary system display screens, in accordance with an exemplary embodiment of the present invention;

FIG. 5 shows a table summary of faults and exemplary heuristics for these faults, in accordance with a respective exemplary embodiment of the present invention;

FIG. 9A shows a table of existing sensors in a generator system, in accordance with an exemplary embodiment of the present invention;

FIG. 9B shows a table of additional sensors, in accordance with an exemplary embodiment of the present invention;

FIG. 10 shows a table, of Wavelet decomposition level bands, in accordance with an exemplary embodiment of the present invention;

FIG. 12 shows a comparison of the average values of actual peak vs RMS processed sensor data for a combustion event on a given generator under loaded versus unloaded conditions, in accordance with an exemplary embodiment of the present invention.

DETAILED DESCRIPTION OF THE INVENTION

The invention, as described by the claims, may be better understood by reference to the following detailed description. The description is meant to be read with reference to the figures contained herein. This detailed description relates to examples of the claimed subject matter for illustrative purposes, and is in no way meant to limit the scope of the invention. The specific aspects and embodiments discussed herein are illustrative of ways to make and use the invention, and are not intended to limit the scope of the invention, a universal heuristic diagnostic and prognostic system and method, a GMS.

Figure 1A:
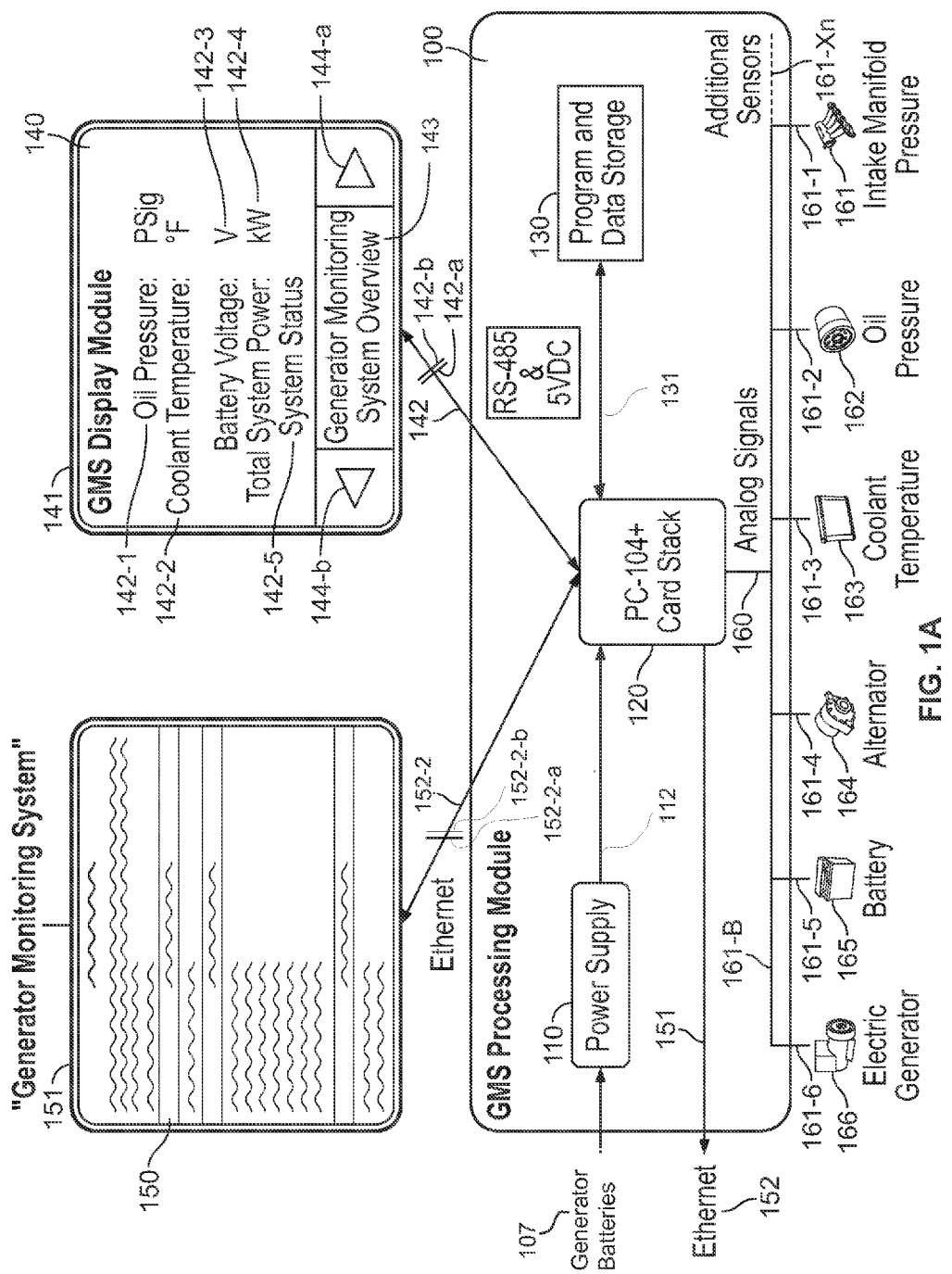

FIG. 1A shows a block diagram of a GMS processing module with sensor sources, an exemplary network display available via an Ethernet connection, and an exemplary module display available on the display module, in accordance with an exemplary embodiment of the present invention. In accordance with an exemplary embodiment of the present invention, generator batteries 107 provide 24 volts DC to the GMS processing module 100. An Ethernet connection 152 is provided for output to a connected network. In the exemplary embodiment of FIG. 1A, another Ethernet connection 152-2 is shown connected to a GMS 151 screen 150 and is used for two way communication 152-2-a, 152-2-b. Within the GMS processing module 100 a power supply board 110 connects to the 24 volts DC input 107 and outputs 112 power to the PC-104 card stack boards 120. In accordance with an exemplary embodiment, PC-104 Card Stack 120 has more than one board. Program and data storage 130 is interconnected 131 with the card stack board 120 and resides within the GMS processing module 100. The power supply card 110 can handle a wide input voltage range, a 24 volt DC power input shown is exemplary, alternate voltage levels can be used as a power source into the power supply card. This adds to the universal applicability to generator systems. A single board computer, an analog to digital converter, and a hardware interface card, not shown, are connected to contribute to the GMS processing module 100. An Ethernet input/output 152-2 comes off the card stack 120 for network connection. Feeding into the card stack 120 are analog signals 160 from a multitude of sensors. In the exemplary embodiment of FIG. 1A, sensor connections 161-6-161-1 connect to a sensor bus 161-B. Shown sensor sources include the electric generator 166, a generator battery 165, an alternator 164, a cooling system 163, an oil supply system, and an intake manifold. The sensors, such as an oil pressure sensor 162, are further described below with reference to FIG. 1B and FIG. 7. In accordance with the exemplary embodiment shown in FIG. 1A, the card stack 120 is made up of several circuit cards to enable the desired GMS functionality.

In the exemplary embodiment of FIG. 1A, card stack 120 is inter-connected to a GMS Display Module 140 and is used for two way communication 142-a, 142-b. In the exemplary embodiment of FIG. 1A, the Display Module 140 may provide touch screen input for the user. The display screen 141 shows an exemplary display which includes Oil Press 142-1, Coolant Temperature 142-2, Battery Voltage 142-3, Total System Power 142-4, and System Status 142-5 under a Generator Monitoring System Overview 143. While touch screen scroll buttons 144-a, 144-b are shown in FIG. 1A, other screen selection configurations may be implemented in alternate embodiments.

FIG. 1B shows a list of additional sensors employed in a GMS, in accordance with an exemplary embodiment of the present invention. The Table-1 180 shows sensors 181 that feed into the card stack, not shown. Sensors 181 that feed into the card stack include: oil pressure 185-1; engine coolant temperature 185-2; manifold absolute pressure 185-3; battery voltage 185-4; alternator output current 185-5; engine vibration 185-6; generator output current 185-8; generator output voltage 185-7. In accordance with an exemplary embodiment a fuel level sensor is employed, not shown. Embodiments of the present invention use existing, original equipment manufacturer's sensors in combination with the additional sensors. These additional sensors readily retrofit into existing generators to provide a complete robust data set desired for the prognostic and diagnostic capacities of the present invention. The additional sensors provided in accordance with embodiments of the present invention not only contribute data acquisition for diagnostics but facilitate the universal capability of the present invention across generator manufacturers and models.

FIG. 1C shows a list a list of parameters measured, in accordance with an exemplary embodiment of the present invention. The table-2 190 shows parameters measured 191 by sensors or calculated from sensor data. Parameters measured 191 include: oil pressure 195-1; coolant temperature 195-2; generated AC output voltage 195-3; generated AC output voltage, current, frequency 195-3; air intake pressure, intake vacuum on the engine intake manifold 195-4; starter current 195-5; engine speed in RPM 195-6; fuel level for the engine 195-7; vibration 195-8; power quality 195-9; battery voltage and current 195-10; alternator charging current 195-11; ambient temperature 195-12; and atmospheric pressure, not shown.

Figure 2A:
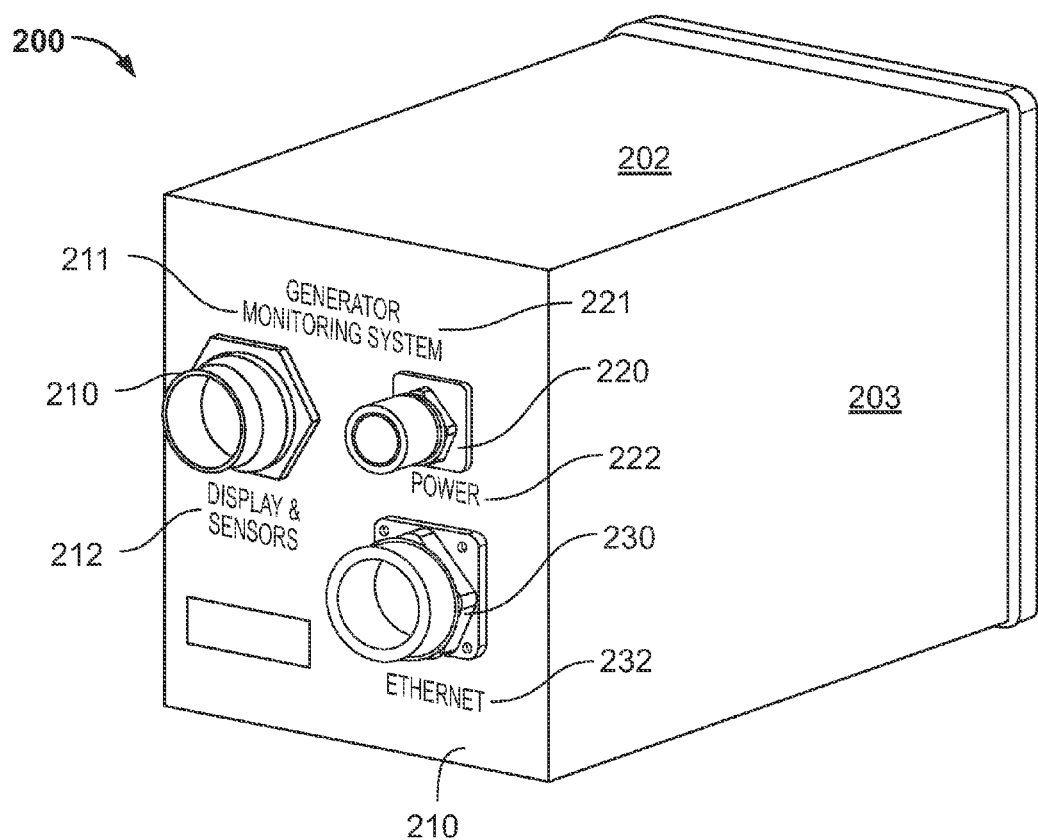
FIGS. 2A-2B show a perspective view of an encased processing module and a field display module, respectively, in accordance with an exemplary embodiment of the present invention.

FIG. 2A shows a perspective view of an encased GMS processing module, in accordance with an exemplary embodiment of the present invention. A top side 202, a right side 203 of the processing module 200 are shown clean in accordance with the exemplary embodiment of FIG. 2A. In alternate embodiments, connectors may be present on any of the module 200 faces. From the left, an input power connector 220 and an output Ethernet connection 230 are shown on a front face. The third connector 210 shown, a sensor/display connector, is an input/output connector. The sensor cables and display cable are bundled into a single cable. The hardware interface card, located inside the encased module and not shown, provides a connection between the internal wiring harness and the external wiring harness. The hardware interface card also includes signal conditioning circuitry, a low power microprocessor and a global positioning system (GPS) module. The module 200 is labeled 211 generator monitor system 221, and a label is provided for each respective connector power 222, display and sensors 212, and Ethernet 232. In alternate embodiments, cable bundling may vary.

Exemplary embodiments of the present invention detect when a generator is powering on. In accordance with an exemplary embodiment, the low power microprocessor monitors engine oil pressure and/or generator battery voltage for sudden changes to determine when a generator is powering on. If the microprocessor detects a change, it will automatically power up the GMS processing module, shown for example in FIG. 1A. This sleep state prolongs generator battery life while also eliminating the need for an operator to turn on the GMS processing module. In addition, in accordance with an exemplary embodiment, if the GMS detects a gradual change in the battery voltage and sensor values indicate a battery voltage value outside acceptable operation parameters, it will automatically power on the generator. In turn, the GMS conserves battery power and also serves to maintain battery voltage levels.

GMS modules, in accordance with an exemplary embodiment of the present invention, can also provide the capability to control external devices. Such devices which GMS modules, in accordance with the present invention, can control include the generator itself and an environmental control unit. Control of the generator may be afforded by starting and stopping the engine on the subject engine driven generator. Additional or alternate control may be obtained via opening and closing electrical contacts to enable or disable power generation. Further, in yet another monitor embodiment, the GMS could adjust a generator output frequency if an output generator frequency fault or fault warning is detected. In accordance with another exemplary embodiment, the GMS may start and stop the subject generator to recharge a low battery.

Figure 2B:
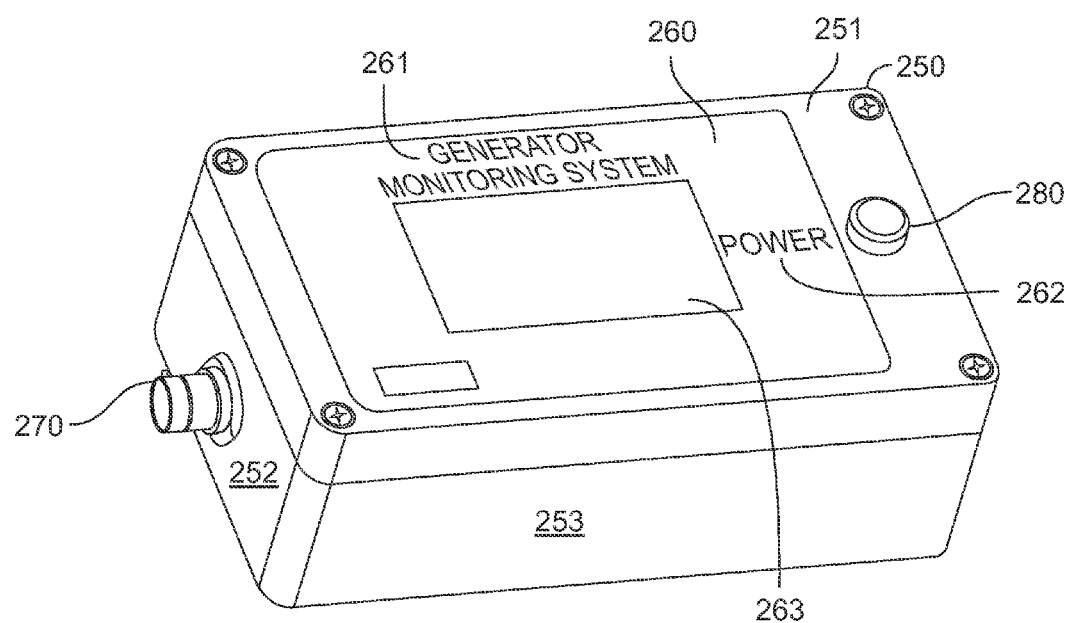

FIG. 2B shows a display module in accordance with an exemplary embodiment of the present invention. In accordance with an exemplary embodiment, the display module 250 has a display screen 260 on its top 251 face. A heading 261 indicates a generator monitoring system screen with an exemplary a graphical touchscreen 263 for user interface is being displayed. This display module is local, onsite with the generator being monitored. In accordance with an alternate embodiment, the display module is optional. In still other embodiments, the display module provides a basic readout of the algorithm analysis on the subject generator. The user display may be made up of several information screens that the user can navigate between systems being monitored by using software defined touchscreen buttons on the display. There may also be a screen or display mode for each main component of the GMS system. The display module may also provide the user with controls to power the GMS on and off. In accordance with an exemplary embodiment, the user is given the ability to power the GMS on and off via, for example, a touchscreen on the display module when the generator is not operating. In the embodiment of FIG. 2B, a touch button 280 labeled 262 power is provided to power the GMS on or off. A left side 252 of the module 250 has an exemplary connector 270 for connection to the processing module, not shown. In accordance with the exemplary embodiment of FIG. 2B, the front face 253 is clean.

Information on exemplary screens available to a user of the display module may include that provided in FIG. 3. In practice the information may be displayed in an easily read and user friendly format. For displays acquired via the Ethernet connection, additional screens may be available and may include, for example, a GMS summary screen. FIG. 3 shows an exemplary system display screen in accordance with an exemplary embodiment of the present invention. Turning to FIG. 3, The display of Table 3 300 has heading Overview of System Performance 301, which divides the system performance into four categories, System Overview 310, Battery/Alternator Measurements 330, Power Measurements 320, and Engine Mechanical 340. Under each of the categories are series of measurements, statuses, and fault conditions. In accordance with an exemplary embodiment, each category and each of its respective measurements, statuses, and faults can be selected by, for example, touch screen for additional detail and/or additional screen selections. Table-3 300 provides an exemplary information presentation for the user's ready system assessment.

Under System Over view 310 oil pressure 311, engine coolant 312, battery voltage 313, total system power 314, and system status 315 are displayed. Under Battery/Alternator Measurements 330 battery voltage 331, alternator current 332, and faults 333 are displayed. In accordance with the exemplary embodiment of FIG. 3, under faults 333 of the Battery/Alternator Measurements 330 the following fault types are displayed: alternator under current fault 333-1; alternator over current fault 333-2; alternator diode fault 333-3; low battery fault 333-4; and cranking low battery fault 333-5. Category Power Measurements 320 has the following measurements displayed: voltage and amps for each phase 321; power factor 322; frequency 323; phase balance 324; and faults 325. In accordance with the exemplary embodiment of FIG. 3, under faults 325 of the Power Measurements 320 the following fault types are displayed: ground fault 325-1; phase imbalance fault 325-2; voltage fault 325-3; frequency fault 325-4; and wet stacking fault 325-5. Category Engine Mechanical 340 has the following measurements displayed: oil pressure 341; coolant temperature 342; manifold absolute pressure 343; vibration 344; and faults 345. In accordance with the exemplary embodiment of FIG. 3, under faults 345 of the Engine Mechanical 340 the following fault types are displayed: low oil pressure fault 345-1; high oil pressure fault 345-2; low coolant temperature fault 345-3; high coolant temperature fault 345-4; and high intake vacuum fault 345-5.

A GMS processing module, in accordance with exemplary embodiments of the present invention support an Ethernet connection to any standard network using an integrated RJ 45 bulkhead connector. The Ethernet connection allows an isolated device, for example, an isolated GMS to become network capable. Perhaps a multitude of GMS will be connected via Ethernet into a regional command and control center. The network connection can afford provision of additional and more advanced information processing.

The network capability provides an enhanced user interface with a standard web browser. Using any generic computer an operator can call up the GMS internet protocol address and view more detailed GMS information on screen. Still using a remote or local computer, the user, in accordance with an exemplary embodiment of the present invention can control devices connected to the GMS processing module.

Figure 4:
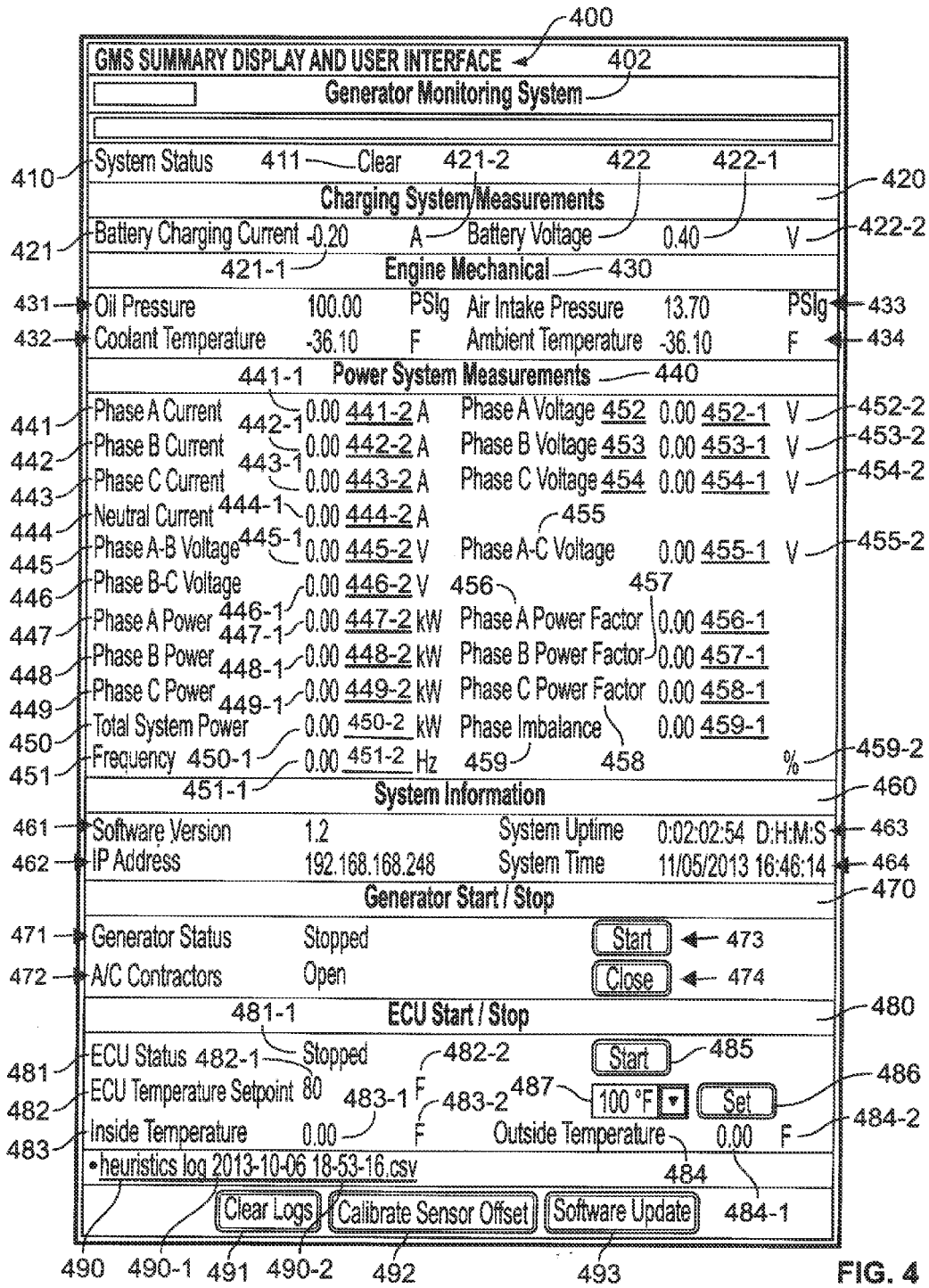
FIG. 4 illustrates a GMS summary display and user interface, in accordance with an exemplary embodiment of the present invention.

FIG. 4 illustrates a GMS summary display and user interface available via an Ethernet connected PC, in accordance with an exemplary embodiment of the present invention. With a network connection a respective GMS can communicate with centrally located servers. Real time updates may be provided for multiple remote GMSs to a central operation center. This enables an operator to view the operations, diagnostics and prognostics of multiple fielded generators from a given location.

In accordance with exemplary embodiments of the present invention, a core function of the GMS processing module is data intake, date collection, and data analysis algorithms. These analysis algorithms provide diagnostic and prognostic information on the engine driven generator being monitored by the GMS. Data sets are continuously collected from all sensors by a software application residing on the single board computer. Each monitoring point will provide key indicators to an overall operation condition. Each sensor data set processes through multiple steps complete analysis of, for example, operating conditions and fault conditions. The data is compared with multiple threshold criteria to determine a warning state or a fault condition.

Turning to FIG. 4, GMS Summary Display and User Interface 400 is the exemplary screen shot. Generator Monitoring System 402 provides the Exemplary title seen by the viewer. Immediately at the top, the display shows system status 410 and a condition of clear 411, no fault conditions present. The exemplary display provides five categories: Charging System Measurements 420; Engine Mechanical 430; Power System Measurements 440; System Information 460; Generator Start/Stop 470; and ECU Start/Stop 480. Under the Charging System Measurements 420 category the battery charging current's 421 numerical measurement 421-1 is provided with its respective unit, Amps, 421-2. Under the same category battery voltage's 422 numerical value 422-1 is provided with its respective unit, Volts, 422-2.

Under the Engine Mechanical 430 category oil pressure, oil pressure's numerical value 100.00 and its respective unit, PSIg are shown 431. Under oil pressure, coolant temperature, coolant temperature's numerical value −36.10 and its respective unit, degrees Fahrenheit F are shown 432. Turning to the right side, under the Engine Mechanical 430 category air intake pressure, air intake pressure's numerical value 13.70 and its respective unit, PSIg are shown 433. Under air intake pressure, ambient temperature, ambient temperature's numerical value −36.10 and its respective unit, degrees Fahrenheit F are shown 434.

Under the Power System Measurements 440 category the phase A current's 441 numerical measurement 441-1 is provided with its respective unit, Amps, 441-2. Under the same category phase B current's 442 numerical measurement 442-1 is provided with its respective unit, Amps, 442-2. Remaining phase C current's 443 numerical measurement 443-1 with its respective unit, Amps, 443-2 and neutral current's 444, numerical measurement 444-1 with its respective unit, Amps 444-2 are provided. Similarly phase voltage and phase power are displayed. More particularly, line to line phase A-B voltage's 445 numerical measurement 445-1 is provided with its respective unit, Volts, 445-2. Line to line phase BC voltage's 446 numerical measurement 446-1 is provided with its respective unit, Volts, 446-2. Phase A, Phase B, and Phase C 447, 448, 449 power measurements are shown with respective numerical values 447-1, 448-1, 449-1 with respective units kW 447-2, 448-2, 449-2 are displayed. Total System Power 450, value 450-1 in kW units 450-2 and Frequency 451 in Hz units 451-1 with its numerical value 451-2 complete the left side of the display under the Power System Measurement heading 440. Moving to the right column under the same heading, phase A voltage's 452 numerical measurement 452-1 is provided with its respective unit, Volts, 452-2. Phases B and C respective voltage's 453, 454, respective numerical measurements 453-1, 454-1 with its unit, Volts, 453-2, 454-2 are shown below Phase A. Across from line to line Phase A-B Voltage is Phase A-C line to line Voltage 455 with its numerical value 455-1 and units, Volts 455-2.

Finally, in accordance with the exemplary embodiment of FIG. 4, the power factor of each phase is provide to the right of respective phase power. Phase A Power Factor 456 and its numerical measurement 456-1 are provided. Power Factor of Phases B and C 457, 458 and respective numerical measurements 457-1, 458-1 are shown below Phase A. Phase Imbalance 459 and its numerical value 459-1 complete the phase measurements calculated and displayed.

Under the System Information 460 category software version 461, IP address 462, system uptime 463 and system date and time 464 are provided. Under the Generator Start/Stop 470 category generator status 471, and A/C Contractors status 472 are provided. A start/stop display button is provided 473 and an open/close display button for the user to update 474 is provided. Under the Environmental Control Unit Start/Stop 480 the display provides status 481, temperature setpoint 482, inside temperature 483, and outside temperature 484 with respective values 481-1, 482-1, 483-1 and 484-1. A start/stop 485 display button for the environmental control unit is provided for the user. An adjustable user defined thermostat setting and set point actuating display button 487, 486 are provided. Finally, a user interface for logs, sensor calibration and software update is provided beneath the ECU Start/Stop category. A comma separated value text file is available for the heuristics log 490 for exporting or other action. The latest heuristic log date 490-1 and time 490-2 is provided. A Clear Logs display button 491, a Calibrate Sensor Offset button 492, and a software update button 493 are provided at the bottom of the screen and take the user to respective interactive and informative displays.

FIG. 5 shows a summary of faults and exemplary conditions for these faults, or heuristics in a table, in accordance with a respective exemplary embodiment of the present invention. Table 5 500 is titled Fault Summary Table 501 and has two columns labeled Fault 510 and Fault Condition 550. The left column identifies the fault type and the right column dictates the threshold levels for which the corresponding fault condition will be recognized and identified for the user. Expected parameter values may be calculated from known generator operating conditions or maybe determined when the GMS is brought online and learns the actual operating conditions of the subject online generator. An example of fault type is a ground fault warning, which will be levied if the actual neutral current, as recorded by sensors and calculated by a data analysis algorithm, differs from the expected neutral current for a given operating condition by more than 1.5 amps. Turning to the table, Ground Fault 511 is determined if the expected neutral current and actual neutral current differ by more than 1.5 amps 551. A Phase Imbalance Fault 512 is determined if total power is greater than 2 kW and phase imbalance is greater than 20 percent 552. A Voltage Fault 513 is determined if any phase is outside of the range 120 V RMS+/−10 percent 553. A Frequency Fault 514 is determined if Phase A frequency is outside of the range of 60 Hz+/−5 percent 554. A Wet Stacking Warning 515 is generated if generator output power is less than 55.5 percent of rated load, which may be 18 kW 555 and which may be based on the generator panel rating, for example. An Alternator Under Current Fault 516 is determined if battery voltage is less than 28 volts and battery charging current is less than 1 Amp 556. An Alternator Over Current Fault 517 is determined if battery voltage is greater than 28.3 Volts and battery charging current is greater than 3 Amps 557. An Alternator Diode Fault 518 is determined if the percent of time the battery is discharging is greater than 20 percent when the average battery charging current is greater than 2 Amps 558. A Low Battery type 1 Fault 519 is determined if battery voltage falls below 23.4 Volts while supplying less than 10 Amps of current 559. A Low Battery type 2 fault 520 is determined if the rate of change of battery charging current is less than 15 mA/S, the engine is running, and the charging current is greater than 8 Amps 560. A Degraded Battery Fault 521 is determined if the engine has been running for 2 or more hours and the battery charging current is greater than 6 Amps 561. A Low Cranking Amps Fault 522 is determined if battery voltage falls below 14 Volts while supplying current at greater than 10 Amps 562. A High Oil Pressure Fault 523 is determined if oil pressure rises above 85 PSI 563. A Low Oil Pressure Fault 524 is determined if oil pressure falls below 20 PSI 564. A High Coolant Temperature Fault 525 is determined if the coolant temperature rises above 220 degree F. 565. A low Coolant Temperature Fault 526 is determined if coolant temperature falls below 32 degrees F. 566. And finally, in accordance with the embodiment shown in FIG. 5, a High Intake Vacuum Fault 527 is determined if the intake vacuum is greater than 15 inches $H_2O$ 570. The fault values identified above are exemplary, not only for a given 18 kW generator but value may also vary across different size generators and different generator systems.

The engine vibration data is processed using Wavelet Analysis and is further described with reference to FIGS. 10 and 11 below. Engine vibration data is analyzed to create an engine vibration normal signature. Key events can be characterized, examined, and monitored over the lifetime of the generator. Wavelet analysis affords a compromise across respective time and frequency resolutions afforded by other analysis forms. For example, the Fourier transform provides good frequency resolution but lacks time resolution. Instead of using a sinusoid of infinite duration like the Fourier transform, the Wavelet transform uses a Wavelet which can be thought of as a brief wave-like oscillation whose amplitude begins and ends at zero. This approach can be very powerful and allows a signal to be analyzed at an optimal detail at both large and small scales. Wavelet analysis with the present invention is further described herein.

Collected data is also subjected to trending analysis. A learning algorithm learns the operation parameters, for example, voltages, loads, ambient pressure, and ambient temperature. Then, another algorithm, or a same algorithm, looks for changes of, for example, 5% to 10% from respective learned values. An exemplary algorithm determines if the monitored component will experience some failure mode using data trending combined with the heuristics, exemplary examples of which are provided in FIG. 5. Features such as coolant thermostat duty cycle, combustion peak power, engine speed, and output power are extracted from the collected sensor data to provide detailed analysis for the current operation condition.

Fault Conditions in FIG. 5 are exemplary, alternate conditions may be employed in a given generator and across different generators. For example, at line 2 the fault condition of if total power is greater than 2000 W and if phase imbalance is greater than 20%, then a phase balance fault exists may not be a fault condition in accordance with an exemplary embodiment. In alternate embodiments, the out balance KVA as a function of generator KVA capacity for a measured power factor may be the bases for a phase balance fault.

In addition to data collected from the sensors, the GMS may also collect certain environmental conditions such as ambient temperature and atmospheric pressure. These values combined with key generator parameters such as percent load are used to learn how the generator systems respond in varying operating conditions. In accordance with exemplary embodiments of the present invention, a Learning Algorithm runs to learn the generator operating conditions and enables the universal aspect of the GMS. The GMS will also accommodate fixed data or fixed criterion or criteria for assessing a fault condition.

Figure 6A:
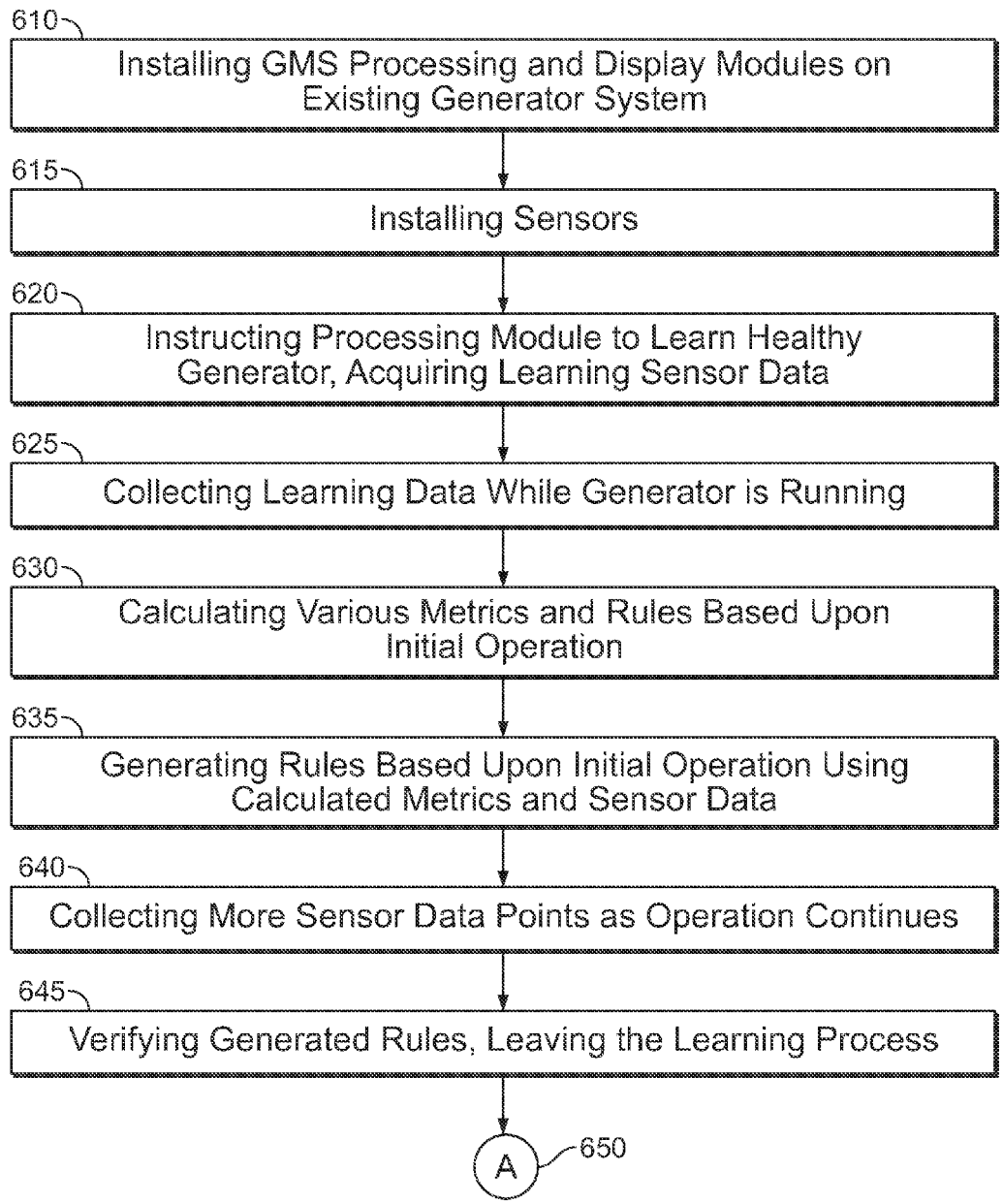
FIGS. 6A and 6B show block diagrams of a method of learning a generator system and a method of detecting faults, respectively in accordance with an exemplary method of the present invention.
Figure 6B:
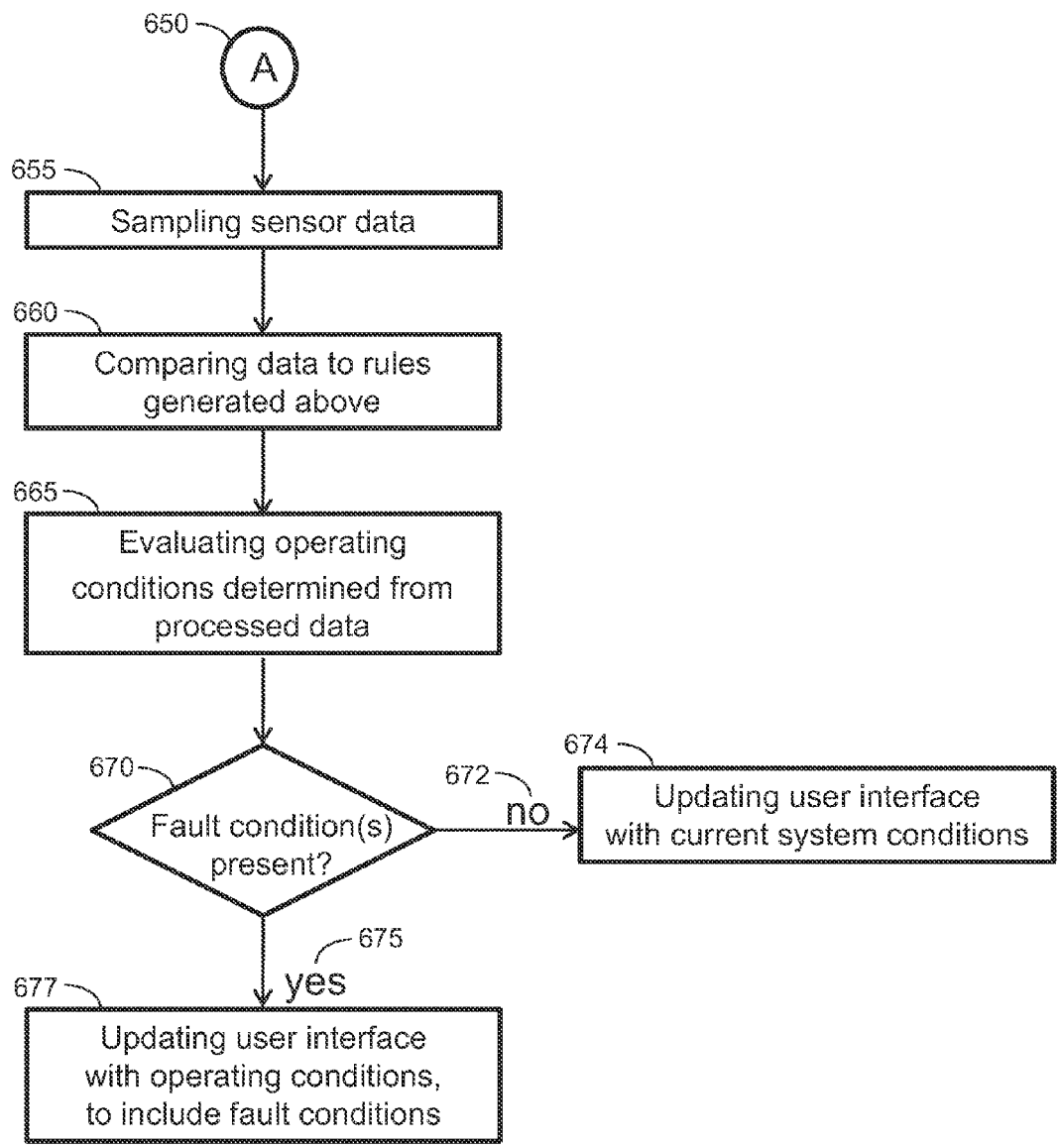

FIGS. 6A and 6B show block diagrams of a method of learning a generator system and a method of detecting faults, respectively, in accordance with an exemplary method of the present invention. Referring to FIG. 6A, the method includes: installing respective GMS processing and display modules on existing generator system 610; installing additional sensors and connecting sensor outputs to the GMS processing module 615; instructing processor module to learn healthy generator, acquiring learning sensor data 620; and collecting learning data while the generator is running 625. The learning method may further include, in accordance with an exemplary embodiment. Referring again to FIG. 6A, an exemplary learning method includes: recording ambient conditions and transforming analog data to digital data; calculating various metrics and rules base upon initial operation 630; generating rules based upon initial operation using calculated metrics, sensor data, and user defined criteria 635. In accordance with alternate embodiments, user defined data may be absent. Element methods in FIG. 6A are exemplary. Elements may be performed in an order different than that presented. As an example, installing sensors may be done before installing the GMS modules; one or ordinary skill recognizes the entire GMS elements are interconnected. The exemplary method may further include: generating rules based upon initial operation using calculated metrics and sensor data 635; collecting more sensor data points as operation continues 640; verifying generated rules 645; and leaving the learning process.

FIG. 6B shows a block diagrams of a method of detecting faults, in accordance with an exemplary method of the present invention. Referring to FIG. 6 and continuing from the learning method of FIG. 6A 650, an exemplary method includes: sampling sensor data 655; comparing data to rules generated above 660; evaluating operating conditions determined from processed data 665; asking fault condition present 670; comparing sampled data to heuristics; if condition present 670, 675 updating user interface with operation conditions, to include fault conditions 677; and if not 672, updating user interface with current system conditions 674.

In practice and in accordance with an exemplary embodiment, a GMS is installed on a healthy generator system; a user instructs the processing module to learn the subject generator; the GMS starts data collection while the generator is operational; the GMS processing module calculates various metrics and rules, heuristics, based upon initial operation performance; and the GMS collects additional data from the operating generator. In accordance with another exemplary embodiment, a healthy generator is assumed and in application of the GMS system the onset of learning need not be user initiated and is automatic instead. When steady state conditions are detected, the GMS may leave the learning process, the Learning Algorithm. Subsequent current sampled sensor data is compared to rules generated during the learning process. Conditions, as defined by processed sampled data, are assessed for fault or potential fault conditions and fault or warning conditions will be detected. Fixed values or fixed data are also assessed for fault or potential fault conditions. In accordance with an exemplary embodiment, fixed parameter data such as AC output frequency is input by the user. While in another exemplary embodiment, fixed data is learned at onset from sampled sensor data. Additional fixed data may be used. Fixed fault conditions may also be implemented, for example, low battery voltage. Such fixed fault conditions may have more than one criterion and may be user defined. The user interface is updated with current operation conditions and other information such as a fault condition. The Learning Algorithm extracts information from the measured data and uses that information to compare to a learned model. This learned model is independent of manufacturer, generator model, or engine model. It will quickly identify and define a healthy system and save key characteristics for comparison to subsequent generator system operation data. The generator system includes the generator, an engine, and a generator battery.

Figure 7:
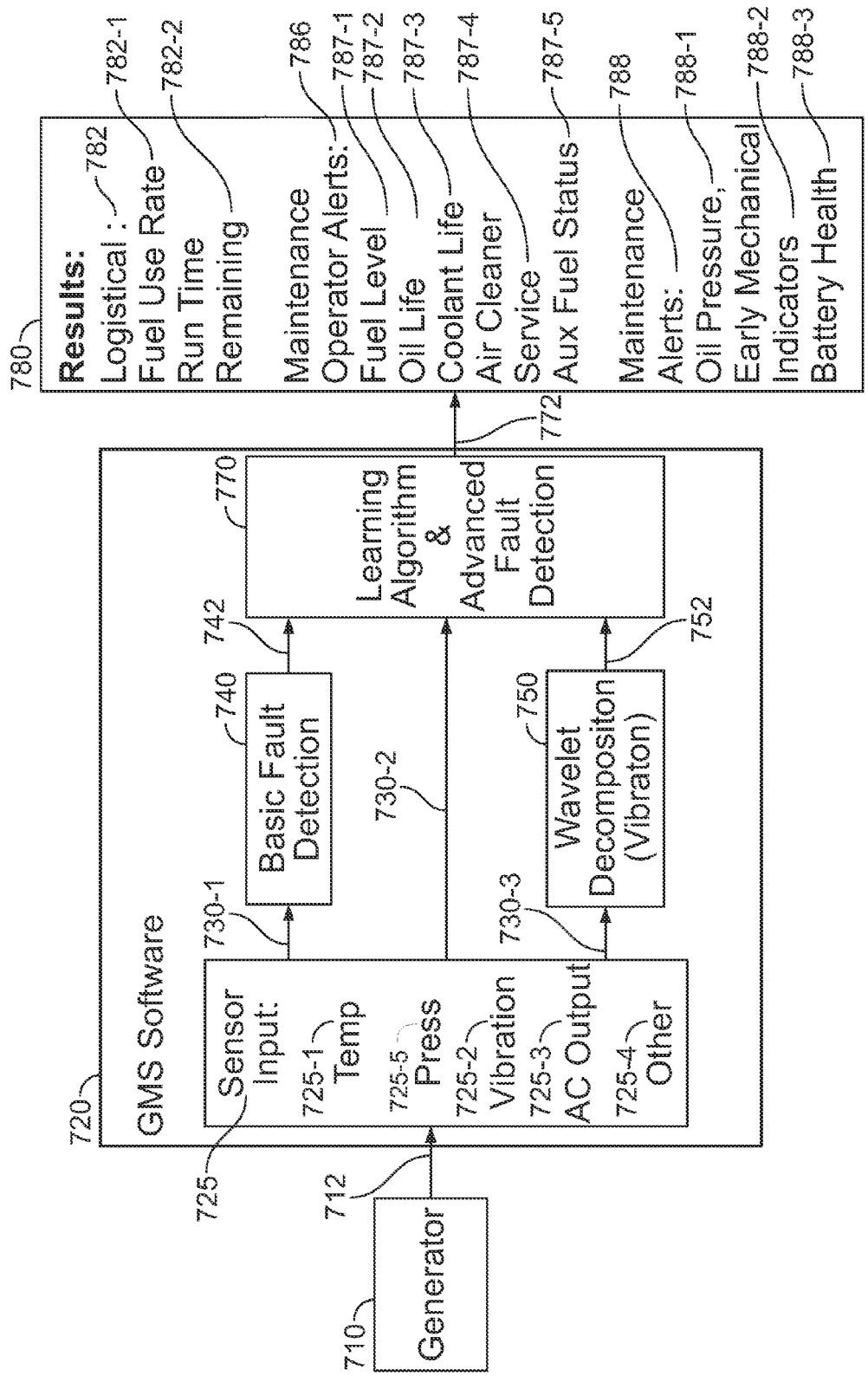
FIG. 7 shows a block diagram of a GMS, in accordance with an exemplary embodiment of the present invention.

FIG. 7 shows a block diagram of GMS software function, in accordance with an exemplary embodiment of the present invention. The Learning Algorithm processes the sensor inputs to obtain measurements and calculations of the desired parameters. Exemplary input data sources arising from the generator system are shown left, exemplary data processing is shown center, and resulting exemplary output is shown right. More particularly, FIG. 7 shows a generator 710 forwarded data 712 to a GMS software block 720 which outputs results 780 for the user. FIG. 7 shows sensor inputs of coolant temperature (Temp) 725-1, oil pressure (Press) 725-5, engine vibration (Vibration) 725-2, generator AC output in voltage and current (AC output) 725-3 and additional sensors (Other) 725-4. The data is forwarded 730-1 and compared to heuristics for determination of an existing or imminent fault condition (Basic Fault Detection) 740. Vibration data is forwarded 730-3, processed and analyzed using Wavelet analysis (Wavelet Decomposition (Vibration)) 750. Wavelet processed data, and non-Wavelet processed data are also input 730-2 to the Learning Algorithm 770 and to an advanced fault detection algorithm 770, shown as a single block. In accordance with the exemplary embodiment of FIG. 7, results 780 from GMS software 720 are output 772 for the user and include maintenance operator alerts 786, maintenance alerts 788, and logistical feedback 782.

From the algorithm block 770, results of Logistical feedback, operational maintenance alerts, and repair indicator maintenance alerts are provided as output to the user. Logistical feedback 782 includes current fuel use rate 782-1 and fuel time remaining 782-2; normal fuel use rate, not shown, is also provided for the user. Maintenance operator alerts include fuel level 787-1, oil life 787-2, coolant life 787-3, air cleaner service 787-4, and auxiliary fuel status 787-5. Additional maintenance alerts 788 include oil pressure 788-1, early mechanical indicators 788-2, and battery health 788-3. The Learning Algorithm will develop a map that maintains how key parameters of the system respond at varying load and environmental conditions. Data is learned at a given load and environmental condition after the system reaches a steady state. Upon learning this baseline the data is immediately used to validate that the generator system's initial operation performance is healthy and fault free. Over time trends in the learned data, in the ongoing recorded data, and across both the learned initial data and the ongoing recorded data may be used to predict failure and to provide fault and warning notifications to the user interface. Steady state may be determined by analyzing sensor data for fluctuations in the coolant temperature to detect the thermostat state, for changes in oil pressure, and for coolant temperature. The fluctuations in the temperature of the coolant can be attributed to the opening and closing of valves in the cooling system. Based on the overall trend of the temperature and the valve state, the steady state algorithm can determine the generator system operating state.

The learned data, acquired and analyzed during an initial generator system start up via the Learning Algorithm, can be utilized in maintenance based activities, in accordance with an exemplary embodiment of the present invention. Monitoring fuel usage rate as a function of engine load and operating conditions, such as ambient temperature in conjunction with monitoring current fuel levels may be made available to remote or local operators. Via the Ethernet connection, the GMS provided fuel information can be automatically reported to users across a network. Generator system GPS data, as well as time remaining for an existing fuel supply, can be transmitted to a desired central fuel location, for example; in turn, fuel resupply can be automatically scheduled. Similarly, fault prediction indicators can be used to order service parts and schedule maintenance, either locally on centrally. Down time can be reduced with accurately determined maintenance needed and this maintenance can be scheduled for non-peak, and even low, power demand times.

Figure 8:
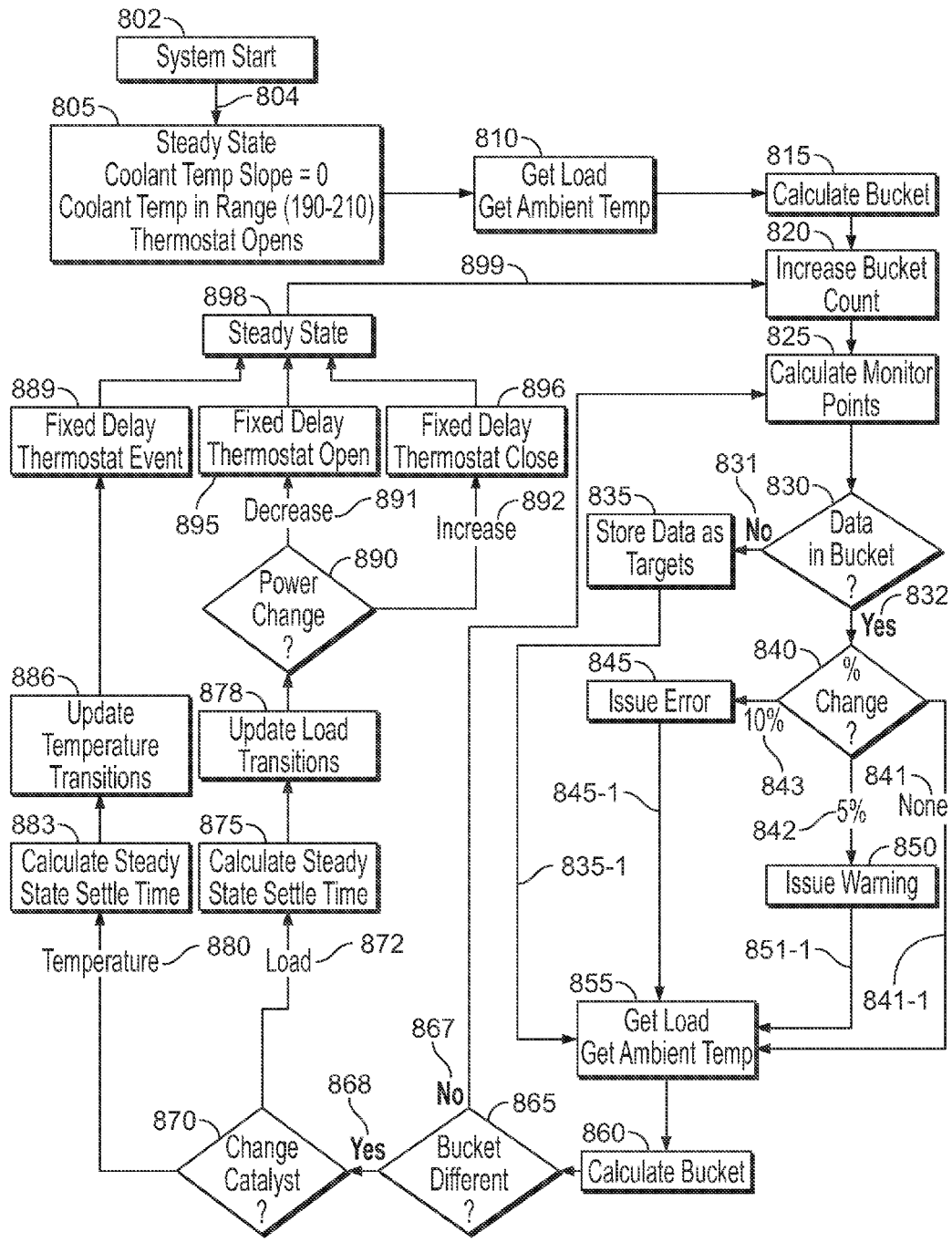
FIG. 8 shows a block diagram of determining a condition of steady state operation, in accordance with an exemplary embodiment of the present invention.

FIG. 8 shows a loop block diagram of method of monitoring and measuring a condition of steady state operation, in accordance with an exemplary embodiment of the present invention. From GMS (system) start 802, the system sets 804 to a time zero steady state 805 where the coolant temperature has one point, no slope, coolant temperature is within the 190 to 210 degrees F. range and the coolant thermostat opens. The method gets load data and ambient temperature data 810. A first start bucket is calculated 815 and the bucket count is increased 820. From increasing the bucket count 820 the system moves to calculate the monitoring points 825. Is there existing bucket data 830? If no 831, then store respective data as respective targets 835. Then 835-1 get current load data and ambient temperature data 855. If yes 832, then evaluate the percent in change of the given data type 840. If there is no percent change or less than 5 percent change 841, then 841-1 get load data and get ambient temperature data 855. If the percent change is 10 percent or greater, then issue an error 845 to the user and in the heuristics log. And proceed 845-1 to get current load data and ambient temperature data 855. If the percent change is at least 5 percent but less than 10 percent, then issue a warning 850. And proceed 851-1 to get the current load data and ambient temperature data 855. In alternate embodiments issuing warnings and getting current load and ambient temperature data are performed in parallel. Similarly, issuing a warning may be performed in parallel with getting current load and ambient temperature data. In still alternate embodiments, the values that set no percent change status, warning status, and error status may be increased or decreased, respectively.

From acquired load data and ambient temperature data calculate bucket 855, respectively 860. Check for change in bucket 865. If no difference 867, then calculate monitor points 825. If a bucket difference exists 868, then determine change catalyst 870. If the cause of the change is load 872, then calculate steady state settle time 875 and update load transitions 878. If the cause of the change is temperature 880, then calculate steady state settle time 883 and update temperature transitions 886. After updating load transitions 878, determine power output change 890. If the change is an increase 892, then instigate fixed delay to close the thermostat 896. If the power change 890 is a decrease 891, the instigate a fixed delay to open the thermostat 895. If the cause of the change was temperature 880, after updating temperature transitions 886 then execute a fixed delay thermostat event, the event is to open the thermostat for an increase in temperature and that event is to close the thermostat if the temperature decreased. After adjusting the thermostat the system moves into a new steady state 898. From steady state the system moves 899 to increase the bucket count 820 and the monitoring cycle continues with calculating monitor points 825 until the system is stopped.

FIG. 9A shows a table of existing sensors and FIG. 9B shows a table of additional sensors that are used in a generator system, in accordance with an exemplary embodiment of the present invention. In accordance with exemplary embodiments, additional existing generator sensors may be employed in the monitor of the present invention and/or additional existing sensors may be present but not employed by the present monitor invention. Where possible, data from original equipment sensors is utilized. FIG. 9A shows Table 6 901, titled Existing Sensors 905. Table 6 provides: sending unit 910; the subsystem measured 920; the measured data type 930; and additional information 940 as headings in the Existing Sensors 905 table. Additional information gained 940 is derived from the collected sensor data. Engine coolant 912 serves as the sending unit for the engine cooling subsystem 922. The respective sensor measures temperature 932 and processed data is used to assess thermostat operation and cooling system performance 942. In accordance with another exemplary embodiment, multiple sensors are employed for measuring temperature in the engine cooling subsystem. Fuel level 916 serves as the sending unit for the fuel delivery subsystem 926. The respective sensor measures absolute gallons or percent of volume capacity available, remaining 936, and processed data is used to assess current fuel use rate 946.

FIG. 9B shows a table of additional sensors, in accordance with an exemplary embodiment of the present invention. FIG. 9B shows Table 7 951, titled Additional Sensors 952. Table 7 provides: added measurement 960; the subsystem measured 970; the measured data type 980; and additional information 990 as headings in the Additional Sensors 952 table. Additional information gained 990 is derived from the collected sensor data. Vibration 961 is measured for the mechanical subsystem of the engine 971. Vibration is also measured for the mechanical subsystem of the generator 971. In accordance with an exemplary embodiment, acceleration 981 is measured via vibration sensors and mechanical integrity is assessed from processed sensor data 991. Accessory behavior is also assessed 991 using the vibration data. Intake pressure, intake vacuum 962 is measured from the engine air induction subsystem 972. The pressure or vacuum 982 sensed data is analyzed for air cleaner status 992. Oil pressure 963 is taken from the engine lubrication subsystem 973. The measured pressure 983 is analyzed to assess lubrication system performance 993. Battery voltage and battery current 964 are measured from the alternator subsystem, engine electrical system 974. The hall effect 984 sensor data is analyzed to assess battery health, state of battery charge, alternator status, and charging current 994. The data types measured on the AC generator include voltage and current 965 across all three phases of the AC generator 975, A, B, and C, as well as neutral 985. These current and voltage measurements are used to assess generator output frequency, load balance across phases, power factor, wet stacking, presence of ground fault, or output power 995. Wet stacking relates to accumulation of unburned fuel in the exhaust system, which may be due to incomplete combustion from low combustion temperatures during extended light load operation of a diesel engine. Ambient temperature 966 is measured for assessment of local operating environmental subsystem conditions 976. The measured temperature 986 is assessed in combination with or as a function of additional measured data to assess ambient conditions on generator performance 996 Atmospheric pressure is also measured for assessment of local operating environmental subsystem conditions. For example, the coolant temperature as a function of ambient temperature may be evaluated. Each measured data may be used to assess multiple factors and correlation across multiple data types may be analyzed to obtain the desired diagnostic and prognostic information, as well as current operating conditions of the generator system.

In accordance with exemplary embodiments of the present invention, the system exits the Learning algorithm when a set of operating conditions is learned. For example, if the system is installed in the heat of summer, a high ambient temperature operation will be learned. In contrast, in winter a low temperature operating condition will be learned. Running the Learning algorithm is ongoing process in accordance with embodiments of the present invention. In accordance with an exemplary embodiment, the learning algorithm is a function of load and ambient temperature, in turn, the learning algorithm relearns generator operating parameters as load and/or ambient temperature change. As new ambient conditions occur and as new load conditions occur, the Learning algorithm learns the new conditions.

The present invention employs Wavelet analysis, among its analyses algorithms, to assess the state of the generator system, to detect any faults, and to forewarn of potential failures. Wavelets can provide a good compromise between time and frequency resolution. Instead of using a sinusoid of infinite duration like the Fourier transform, the Wavelet transform uses a Wavelet which can be thought of as a brief wave-like oscillation whose amplitude begins and ends at zero. One issue with the Fourier transform is that all time information is lost. So while the frequency dependent qualities of the signal are retained after transformation, when an event with a particular frequency occurred is lost. The Short Time Fourier Transform (STFT) attempts to resolve this issue by showing the frequency content of the signal over time. One issue with using a STFT is that there is a tradeoff between frequency and time resolution [1]. A Wavelet transform yields a compromise between time and frequency resolution. Conventionally, Wavelet processing is used extensively on image data and noise removal, signal denoising, and detection of signal discontinuities. [2, 3]

In practice, Wavelet Types, wavelet coefficient fault threshholds, are determined by trial. To analyze the data signal, a mother Wavelet scale is gradually increased while being slid across and correlated with the signal of interest. Locations within the signal with good correlation to the Wavelet have a high value while places with low correlation have a low value. This approach is very powerful and allows a signal to be analyzed at the optimal detail at both large and small scales. [4,5] For example, in an exemplary embodiment, engine rotational vibration may be analyzed at 30 Hz but a combustion event detail may be analyzed at 950 to 5120 Hz.

Selection of an appropriate Wavelet is generally key to getting good useful results from Wavelet transforms across different types and across different applications, be it image grey scale data or vibration data. Selecting an appropriate Wavelet is often complex. One approach is to choose Wavelet characteristics that match the type of feature that one is attempting to isolate and analyze. For example, the Haar Wavelet which resembles a step function is typically good at detecting discontinuities but doesn't do a very good job at filtering a signal due to its discontinuous property. In many applications a trial and error approach is taken to find a Wavelet that shows the best performance. Of two versions of the Wavelet transform, the Continuous Wavelet Transform (CWT) and the Discrete Wavelet Transform (DWT), the DWT was employed, in accordance with exemplary embodiments of the present invention, because of its lower processing requirements. The DWT uses a dyadic, power-of-two, method to break down the original signal into successively larger scales. In the subject application the vibration fault detection algorithm is implemented on a small resource constrained system and experimental results support the choice of a DWT.

From experimental trials, in accordance with an exemplary embodiment, using Wavelets with sinusoidal features such as the Daubechies which is somewhat asymmetric yielded the both useful information and accurate state or condition assessment. Similarly, using the Dmey (dmey8) Wavelet, which is highly symmetric, also yielded accurate data analysis. The exemplary results shown in FIG. 10 are obtained using the Daubechies 20 (db20) Wavelet transform. This transform was selected, at least in part, due to its frequency bandwidth characteristics which have low passband ripple and attenuated stop bands.

FIG. 10 shows a table of Wavelet decomposition level bands, in accordance with an exemplary embodiment of the present invention. In accordance with exemplary embodiments of the present invention, characterization and analysis of engine vibration is performed on the reconstructed low and high frequency vibration signals output from the Wavelet filtering algorithm. Turning to FIG. 10, Table 8 1001, entitled Wavelet Decomposition Level Bands 1002, provides Level 1010, Upper Frequency (Hz) 1020, Lower Frequency (Hz) 1030, Center Frequency (Hz) 1040 and Relevance to vibration analysis 1050 for nine frequency bands. In accordance with an exemplary embodiment and for the data in FIG. 10, a sampling rate of 10,240 hertz is used. This enabled proper positioning of the DWT decomposition levels to permit analysis of key signals of interest. The table of FIG. 10 shows the DWT decomposition frequency bands and their relevance to generator diagnostics. Levels ranging from d1 to d8 1012-1019 and a8 1011, upper frequency 1021-1029, lower frequency 1031-1039, and center frequency 1041-1049 for each respective level, and relevance of each respective level 1051-1059 is provided. For example, level a8 1011, Approximation level 8, is found for frequencies between 20 1021 and zero hertz 1031 with a center frequency at 10 hertz 1041. The relevance of this low frequency band is lacking with respect to vibration analysis 1051.

The majority of vibration information is obtained at the higher frequency bands of levels d1 thru d3. Level d8 1012 at a frequency range between 40 1022 and 20 1032 hertz yields Wavelet data pertaining to engine rotational vibration at 1800 RPM 1052, which is a typical generator RPM. The low frequency components in the d8 band 1012 come from the 30 hertz 1042 unbalanced rotating mass of the engine operating at 1800 RPM 1052. The d7 band 1013 is centered on 60 hertz 1043 which equates to the frequency of the combustion events of a 4 cylinder generator running at this RPM. The high frequency content in the d1, d2, and d3 levels comes from the various components of the engine cycle and includes the combustion event itself 1057-1059, valve train events, as well as various resonances within the engine. From our experimental analysis, we found that the combustion event details have a fairly high bandwidth and span the d1, d2, and d3 bands 1027-1037, 1028-1038, 1029-1039. If only one or two of the bands are used then some detail is missed when the signal is reconstructed. For our analysis of the low frequency signal is composed of the d7 Wavelet coefficients comprising frequencies from 40-80 hertz while the high frequency signal is composed of the d1, d2, and d3 Wavelet coefficients and comprises frequencies from 640 hertz to 5120 hertz 1037-1027, 1038-1037, 1039-1029.

Embodiments of the present invention, automatically detect the wavelet decomposition band with the highest energy, which corresponds to the combustion event. This allows the present invention to compensate for different sampling rates and engine RPMs. In alternate embodiments, the highest three energy bands are determined. In still alternate embodiments, the highest energy band is detected and bands within a given percentage of the highest value are detected. Referring to FIG. 11, FIG. 11 shows the low frequency waveform d7 overlaid on the high frequency waveform d1, d2, d3. The low frequency waveform is generated by using the d7 coefficients, shown in FIG. 10 1013 and running them through the inverse DWT. The high frequency waveform is generated with d1, d2, d3, shown in FIG. 10 1017-1019 coefficients ran through inverse DWT.

Figure 11:
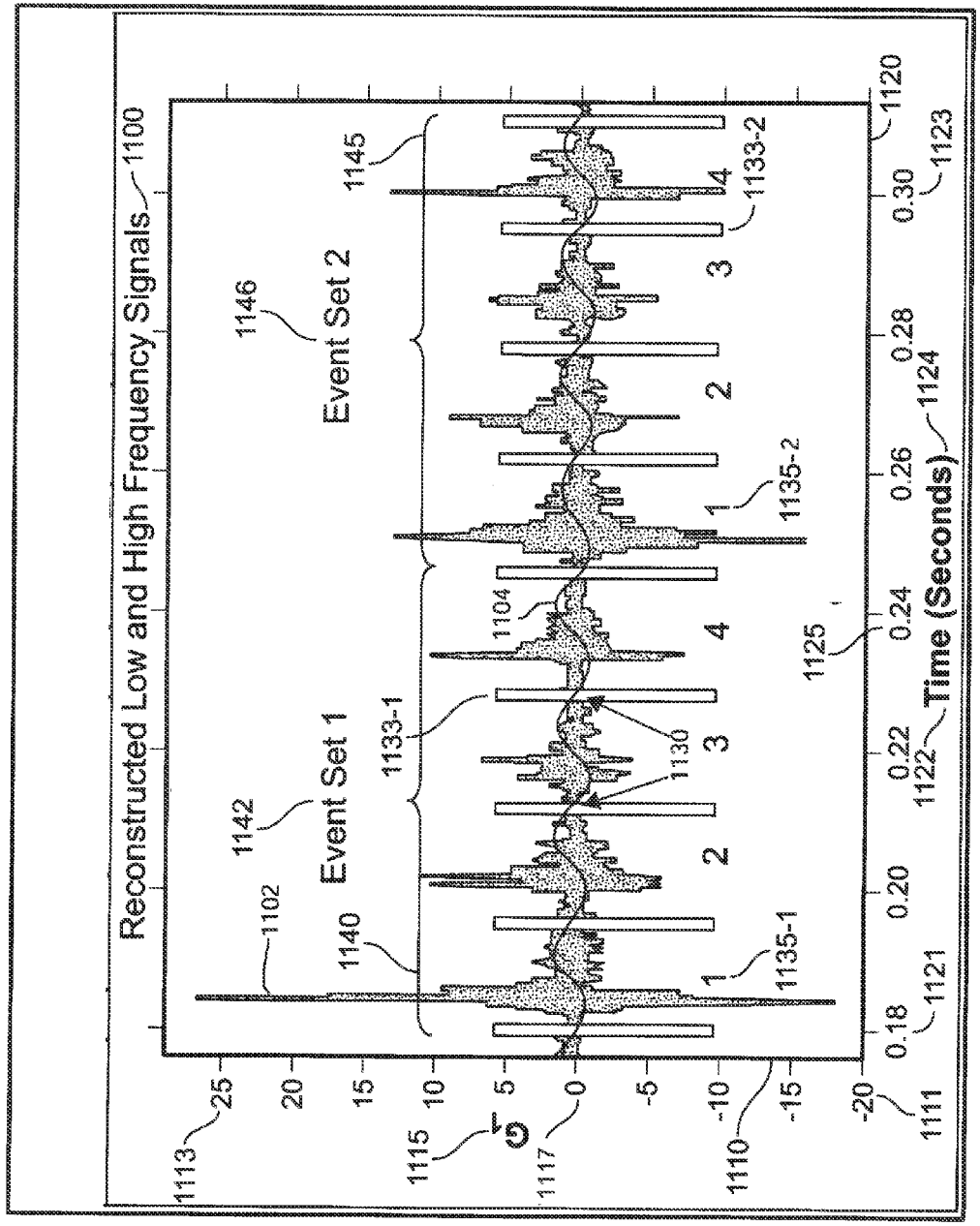
FIG. 11 shows a graph of sampled data, an event set example where a low frequency reconstructed waveform is overlaid on a reconstructed high frequency waveform, in accordance with an exemplary embodiment of the present invention.

FIG. 11, entitled Reconstructed Low and High Frequency Signals 1100, shows a graph of sampled data, an event set example where a low frequency reconstructed waveform 1104 is overlaid on a reconstructed high frequency waveform 1102, in accordance with an exemplary embodiment of the present invention. Signals 1102, 1104 are shown as amplitude $G_1$ 1115 along the vertical axis 1110 as a function of time 1122 in seconds 1124 along the horizontal axis 1120. Signal amplitude 1115 ranges from near −20 G's 1111 to near +25 G's 1113 with the signals nearly center about zero 1117. The time axis 1120 ranges from zero to 0.38 seconds.

The high frequency 1102 signal represents the three lower level bands, d1, d2, and d3, described above with reference to FIG. 10. Referring again to FIG. 11, the low frequency signal 1104 is used as a timing reference to split the high frequency 1102 waveform into combustion events. The algorithm finds the negative slope zero crossing points 1130 in the low frequency 1104 waveform to effectively divide the high frequency waveform into combustion events. Event markers, indicate the start of one combustion and the end of another; event markers 1133-1 and 1133-2 represent the end of the combustion of a lower cylinder in its first and second respective crank revolution in a given cycle.

Knowing the number of engine cylinders, four in this example, the algorithms divides each group of four cylinders into an event set 1142, 1146. Since the diesel engine cycle consists of four strokes each event set consists of two crank shaft revolutions. FIG. 11 shows how the vibration algorithm divides up the input waveform into combustion events and event sets. The event labels 1-4 in FIG. 11 indicate the event within the set. More particularly, 1 1135-1 in event set 1 1142 and 1 1135-2 in event set 2 1146 represent the combustion in a same cylinder. These labels in FIG. 11 do not indicate which cylinder the event is associated with, determined of which is later described.

Once the data is divided into events and event sets, in accordance with an exemplary embodiment, the algorithm computes the Root Mean Square (RMS) of each combustion event and determines the peak for each respective event, greatest absolute value of $G_1$ between zero crossings 1130, as well. Further, the algorithm averages all of the values for each event (e.g. event 1) in each set (e.g. sets 1 through 4) together to measure the average value for that cylinder event. This results in an average RMS and peak value for each cylinder event. In accordance with an exemplary embodiment, the system automatically detects the number of cylinders in the engine from vibration data by correlating different combinations of combustion events. Peak values may also be averaged across engine cycles for a given cylinder and across a respective first or second event set, the first or second crank revolution.

In accordance with an exemplary embodiment, event peak values are selected to provide the indicator for combustion event intensity. Experimental results show favorable results using peak values. In accordance with an alternate embodiment the RMS of the event is used as an indicator of combustion event intensity. FIG. 12 shows a comparison of the average values of the peak vs RMS for a 10 kW tactical quiet generator under loaded versus unloaded conditions. Table 9 1201, entitled Peak vs Average Combustion Events 1202, provides peak $G_1$ values 1230 and RMS $G_1$ values 1235 under a no load 1210 condition for each cylinder 1-4 1250, 1260, 1270, 1280. In the right hand column Table 9 1201 provides peak $G_1$ values 1240 and RMS $G_1$ values 1245 under a 10 kW load 1220 for each cylinder 1-4 1250, 1260, 1270, 1280. Peak values under no load range from 3.05 1282 in cylinder 4 1280 to 11.06 1252 in cylinder 1 1250. As shown in FIG. 12 peak values under the 10 kW load 1220 are about double no load 1210 values. Peak values under 10 kW load range from 6.19 1286 in cylinder 4 1280 to 25.10 1256 in cylinder 1 1250. Turning to respective RMS values, under no load 1210, cylinders range from 0.85 1284 in cylinder 4 1280 to 1.78 1254 in cylinder 1. And RMS values under the 10 kW load, cylinders range from 1.30 1288 in cylinder 4 1280 to 3.87 1258 in cylinder 1. The units for peak and RMS values are denoted (u), the combustion event units being consistently applied across all measurements and are respective to $G_1$. Peak values under no load 1262, 1272 for cylinders 2 and 3 and peak values for cylinders 2 and 3 under 10 kW load 1266, 1276 are within the range bounded by cylinders 1 and 4. Likewise, RMS values under no load 1264, 1274 for cylinders 2 and 3 and RMS values for cylinders 2 and 3 under 10 kW load 1268, 1278 are within the range bounded by cylinders 1 and 4.

As shown in FIG. 12, the RMS values for cylinder 2 and cylinder 3 are somewhat close together but the difference is more pronounced in the peak data. In accordance with an exemplary embodiment, the peak of the combustion event is used to determine event intensity. Cylinders further away from the vibration sensor show reduced amplitude; proximity dependence of measured intensity to sensor location was experimentally verified. Considering a cylinders proximity to the sensor and using the peak values, the present invention determines the cylinder number of a particular combustion event, the cylinder firing order, and the number of cylinders.

In accordance with an exemplary embodiment, to detect faults using this Wavelet data: the cylinder to cylinder intensity ratio; variance in combustion event intensity for a particular cylinder; and deviations from the learned baseline vibration data for a given operating condition are analyzed, respectively. Additionally, the Learning Algorithm determines certain baseline information about the generator such as cylinder count, firing order and engine RPM. The present invention combines trending of historical data, threshold comparisons, and complex Wavelet analysis to enable application of heuristic algorithms to what the GMS has Learned and to recognize imminent malfunctions and issue warnings to personnel, ideally in time to take not only corrective but to take preventative action.

There is a need for an automated diagnostic and prognostic system for installation on fielded generators to provide real time evaluation of the equipment while it is in use. The present invention successfully implements a custom, GMS, software architecture for heuristic prognosis and diagnosis of generator state and performance. Embodiments of the present invention can provide real time measurement-based health status and fuel use rates of the subject generator. The present invention simplifies the maintainers work by automatically testing major subsystems and providing advanced warning of the impending failures due to either simple or complex faults. Fuel use rate information provided by the subject invention assists field units in planning operation based on the actual power and fuel needs of deployed equipment. Such capabilities can improve maintenance posture and energy awareness units in the field. A summary of GMS software is provided in FIG. 7.

To implement these diagnostic and prognostic functions, the invention uses a heuristic algorithm to learn the subject generator system. The present invention is universal, learning the operating parameters of the monitored generator and establishing normal operating parameters of the same. In addition to conventional and often existing sensors, embodiments of the present invention include additional sensors to enable complete generator system monitoring, diagnosis, and prognosis. Embodiments of the present invention have been successfully tested on a 10 kW tactical quiet generator and an 18 kW generator on a trailer mounted support system. The latter system also has an environmental control unit capable of 60,000 Btu/hr (17.5 kW) cooling or 9 or 18 kW heating collocated on the trailer. Environmental control is a large energy load in battlefield environments, the present invention may include control of such devices. An array of parameters were measured, learned, evaluated, and continuously monitored while the generators were running. Parameters monitored include: oil pressure; coolant temperature; AC output voltage, current and frequency; air intake pressure (intake vacuum); starter current; engine speed (RPM); fuel level; vibration; power quality; battery voltage and current; alternator charging current; ambient temperature.

GMS architecture is employed to record sensor data, the sensor data is processed, and values are established for normal operating mode of the generator with respect to ambient environmental and load conditions. Embodiments of the present invention can then continuously monitor a generator's parameters, look for deviations from normal operating mode as indicators of deleterious events, and alert support personnel to present or imminent malfunctions. As part of military energy informed operations, these alerts can not only be made to personnel local to the system, but the data may also be forwarded to initiate additional action, such as requests for refueling, provision of replacement parts, rotation of the affected system to depot for extensive repair or overhaul, and substitution of a replacement unit if necessary. Wavelet analysis, employed in the present invention provides advantages over frequency based analysis, such as Fourier transform, or time based analysis enabling effective system characterization and ongoing evaluation.

One of ordinary skill can appreciate the numerous possibilities, which may be desired to meet local generator monitoring. For example, the number of data points averaged may be varied as desired or to meet system trending needs. The trending method may be particularized to a given sensor type or data type.

While specific alternatives to steps of the invention have been described herein, additional alternatives not specifically disclosed but known in the art are intended to fall within the scope of the invention. Thus, it is understood that other applications of the present invention will be apparent to those skilled in the art upon reading the described embodiment and after consideration of the appended claims and drawings.

REFERENCE LIST

[1] Nijsen, Tamara M. E. et. al.,"Short Time Fourier and Wavelet Transform for Accelerometric Detection of Myoclonic Seizures," Proceedings of the IEEE/EMBS Benelux Symposium, pp. 155-158, December 2006.
[2] "Fengli Wang, Shulin Duan, Hongliang Yu "Fault Feature Extraction of Cylinder-Piston Wear in Diesel Engine with EMD", Advances in Intelligent and Soft Computing Volume 169, 2012, pp 419-424.
[3] Parameswariah, Chethan, "Understanding Wavelet Analysis and Filters for Engineering Applications" Dissertation, Lousiana Tech University, May 2003.
[4] Kumar, Praveen and Foufoula-Georgiou, Efi, "Wavelet Analysis for Geophysical Applications", Reviews of Geophysics, Vol. 35, pp. 385-411, November 1997.
[5] Presentation on wavelet analysis; http://www.google.com/url?sa=t&rct=j&q=&esrc=s&s ource=web&cd= 6&ved=0CFUQFjAF&url=http %3A %2F %2Ffaculty.k-fupm.edu.sa %2Fee %2Fsamara %2F WT_lecture_1. ppt&ei=uEoqUrkcztTZBcmCgJAB&usg= AFQjCNFj0BR096KyV19NmQqpM2kXBrBMtw &bvm=bv.51773540,d.b21

What is claimed is:
1. A method of monitoring and determining a fault condition in an engine driven generator, the method comprising:
    retrofitting additional sensors to the engine driven generator;
    sampling original equipment sensor data from original equipment sensors;
    sampling additional sensors data from additional sensors, said additional sensors including:
        an oil pressure sensor; an intake pressure sensor; an acceleration sensor; a hall effect sensor; an A phase voltage; a B phase voltage; a C phase voltage; a neutral voltage; an A phase current; a B phase current; a C phase current; a neutral current; and an ambient temperature sensor;
    performing a learning algorithm on the sampled original equipment data and on the sampled additional sensors data;

processing a vibration data of the additional acceleration sensor;
decomposing frequency bands of a discrete wavelet transformation of the vibration data into decomposition frequency bands;
analyzing the decomposed frequency bands for normal values;
using peak values of the decomposed frequency bands and a respective known proximity to the additional acceleration sensor, determining a number of firing cylinders and a firing order;
determining a set of normal operating values for the engine driven generator from the performed learning algorithm on the sampled original equipment data and on the sampled additional sensors data;
exiting the learning algorithm;
resampling the original equipment sensor data from the original equipment sensors;
resampling the additional sensors data from the additional sensors;
generating a vibration fault indicator from analyzed decomposed frequency bands peak event values when the determined normal values are exceeded; and
providing the processed vibration data and the generated vibration fault indicator to a user.

2. The method of claim 1, further comprising:
assessing a steady state from the sampling original equipment sensor data from the original equipment sensors and from the sampling additional sensors data from the additional sensors;
performing a learning algorithm on steady state sampled original equipment data and on steady state sampled additional sensors data;
determining a set of normal operating values for the engine driven generator from the performed learning algorithm on the steady state sampled original equipment data and on the steady state sampled additional sensors data.

3. The method of claim 2, further comprising:
resampling the hall effect additional sensor data;
generating an alternator diode fault indicator if battery discharging time exceeds 25 percent of battery charge time when battery charging current exceeds 2 Amps.

4. The method of claim 3, further comprising:
resampling the hall effect additional sensor data;
resampling the A phase current sensor, the B phase current sensor, the C phase current sensor, and the neutral current sensor;
generating a low cranking amps fault indicator if battery voltage is less than 14 Volts when the engine driven generator output is greater than 10 Amps.

5. The method of claim 2, further comprising:
inputting a fixed fault criteria;
comparing resampled additional sensor data to a respective fixed fault criterion; and
generating a respective fault indicator when the resampled data exceeds the respective fixed fault criterion.

6. The method of claim 2, further comprising:
resampling the hall effect additional sensor data;
generating an alternator under current fault indicator if battery voltage is less than 28 Volts and battery charging current is less than 1 Amp.

7. The method of claim 6, further comprising:
generating an alternator over current fault indicator if battery voltage is greater than 28.3 Volts and battery charging current is greater than 3 Amps.

8. The method of claim 2, further comprising:
resampling the hall effect additional sensor data;
generating an degraded battery fault indicator if battery charging current exceeds 6 Amps for greater than 2 hours.

9. The method of claim 1, wherein:
the number of decomposition frequency bands is 10 or fewer levels.

10. The method of claim 1, wherein:
the number of decomposition bands increases with an increasing sampling rate of the additional acceleration sensor.

11. The method of claim 4, further comprising:
resampling a neutral phase current data from the additional neutral phase sensor;
comparing the normal value neutral phase current to the resampled neutral phase current data; and
generating a ground fault indicator if resampled neutral current data is greater than or less than the normal value neutral phase current.

12. The method of claim 11, further comprising:
resampling the A phase current sensor, the B phase current sensor, the C phase current sensor, the neutral current sensor, the A phase voltage sensor, the B phase voltage sensor, the C phase voltage sensor, and the neutral voltage sensor;
generating a phase imbalance fault indicator if an A phase current data is not within 80 to 120 percent of B phase current data and C phase current data, respectively, when a total generator output power is greater than 2 killowatts; and
generating another phase imbalance fault indicator if a C phase current data is not within 80 to 120 percent of a B phase current data, when a total generator output power is greater than 2 killowatts.

* * * * *